United States Patent
Asai

(10) Patent No.: US 10,166,922 B2
(45) Date of Patent: Jan. 1, 2019

(54) ON-VEHICLE IMAGE DISPLAY DEVICE, ON-VEHICLE IMAGE DISPLAY METHOD FOR VEHICLE, AND ON-VEHICLE IMAGE SETTING DEVICE

(71) Applicant: TOYOTA JIDOSHA KABUSHIKI KAISHA, Toyota-shi (JP)

(72) Inventor: Goro Asai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/303,715

(22) PCT Filed: Apr. 10, 2015

(86) PCT No.: PCT/IB2015/000467
§ 371 (c)(1),
(2) Date: Oct. 12, 2016

(87) PCT Pub. No.: WO2015/159142
PCT Pub. Date: Oct. 22, 2015

(65) Prior Publication Data
US 2017/0028921 A1 Feb. 2, 2017

(30) Foreign Application Priority Data
Apr. 14, 2014 (JP) .................... 2014-082912

(51) Int. Cl.
*B60R 1/00* (2006.01)
*G06K 9/00* (2006.01)

(52) U.S. Cl.
CPC ............ *B60R 1/00* (2013.01); *G06K 9/00791* (2013.01); *B60R 2300/802* (2013.01)

(58) Field of Classification Search
CPC .. B60R 1/00; B60R 2300/802; G06K 9/00791
(Continued)

(56) References Cited

U.S. PATENT DOCUMENTS

| | | | | |
|---|---|---|---|---|
| 6,657,555 | B2 * | 12/2003 | Shimizu | B60Q 9/005 180/204 |
| 7,024,286 | B2 * | 4/2006 | Kimura | B62D 15/028 348/119 |

(Continued)

FOREIGN PATENT DOCUMENTS

| | | |
|---|---|---|
| JP | 2006-290134 A | 10/2006 |
| JP | 2008-296789 A | 12/2008 |

(Continued)

OTHER PUBLICATIONS

Petrovai et al, A stereovision based approach for detecting and tracking lane and forward obstacles on mobile devices (Year: 2015).*

(Continued)

*Primary Examiner* — Shan E Elahi
(74) *Attorney, Agent, or Firm* — Oblon, McClelland, Maier & Neustadt, L.L.P.

(57) ABSTRACT

An image display device includes an imaging unit that captures an area including at least a part of a rear wheel of the vehicle and an electronic control unit that: determines whether the vehicle will turn and travel; displays a whole or a part of the area on a display as a non-turning-time image when it is determined by the electronic control unit that the vehicle will travel without turning; displays the whole or a part of the area on the display as a turning-time image when it is determined by the electronic control unit that the vehicle will turn and travel; and sets the turning-time image in such a way that a driver visually recognizes a state of the rear wheel more easily through the turning-time image than through the non-turning-time image.

15 Claims, 4 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 7,423,521 | B2* | 9/2008 | Kukita | ..................... B60R 1/00 |
| | | | | 340/425.5 |
| 9,440,585 | B2* | 9/2016 | Obata | ....................... B60R 1/00 |
| 9,963,071 | B2* | 5/2018 | Asai | ........................ B60R 1/00 |
| 2002/0084916 | A1* | 7/2002 | Shimizu | ................. B60Q 9/005 |
| | | | | 340/932.2 |
| 2004/0204807 | A1* | 10/2004 | Kimura | ................ B62D 15/028 |
| | | | | 701/36 |
| 2005/0107952 | A1* | 5/2005 | Hoshino | ................ G01C 21/36 |
| | | | | 701/431 |
| 2010/0019934 | A1 | 1/2010 | Takano | |
| 2010/0045797 | A1* | 2/2010 | Schofield | ........... G06K 9/00818 |
| | | | | 348/148 |
| 2010/0165100 | A1 | 7/2010 | Asai | |
| 2011/0298988 | A1* | 12/2011 | Kawai | ..................... G06T 5/006 |
| | | | | 348/699 |
| 2012/0169875 | A1 | 7/2012 | Matsukawa et al. | |
| 2012/0287232 | A1* | 11/2012 | Natroshvili | ............... G06T 7/85 |
| | | | | 348/36 |
| 2013/0110371 | A1* | 5/2013 | Ogawa | ................... G08G 1/095 |
| | | | | 701/70 |
| 2014/0071285 | A1* | 3/2014 | Schofield | ........... G06K 9/00818 |
| | | | | 348/148 |
| 2014/0313752 | A1* | 10/2014 | Dierks | ................... B60Q 1/143 |
| | | | | 362/465 |
| 2014/0340521 | A1* | 11/2014 | Obata | ....................... B60R 1/00 |
| | | | | 348/148 |
| 2014/0347469 | A1* | 11/2014 | Zhang | ....................... B60R 1/00 |
| | | | | 348/118 |
| 2015/0191118 | A1 | 7/2015 | Matsukawa et al. | |
| 2016/0152264 | A1* | 6/2016 | Watanabe | .......... B62D 15/0295 |
| | | | | 701/41 |
| 2016/0185292 | A1* | 6/2016 | Asai | ......................... B60R 1/00 |
| | | | | 348/148 |
| 2017/0232898 | A1* | 8/2017 | Maejima | ................. B60R 1/002 |
| | | | | 348/118 |

FOREIGN PATENT DOCUMENTS

| | | | | |
|---|---|---|---|---|
| JP | | 2009-83618 | A | 4/2009 |
| JP | | 2010-34645 | A | 2/2010 |
| JP | | 2011-188275 | A | 9/2011 |
| JP | | 2012-140106 | A | 7/2012 |
| JP | | 2012-195793 | A | 10/2012 |
| JP | | 2014-27353 | A | 2/2014 |
| JP | | 2014-40188 | A | 3/2014 |
| JP | | 2014040188 | A * | 3/2014 .............. B60R 1/08 |
| WO | | 2008/146149 | A1 | 12/2008 |

OTHER PUBLICATIONS

International Search Report dated Aug. 21, 2015 in PCT/IB2015/000467 filed Apr. 10, 2015.

* cited by examiner

ON-VEHICLE IMAGE DISPLAY DEVICE, ON-VEHICLE IMAGE DISPLAY METHOD FOR VEHICLE, AND ON-VEHICLE IMAGE SETTING DEVICE

BACKGROUND OF THE INVENTION

1. Field of the Invention

The present invention relates to an on-vehicle image display device, an on-vehicle image display method for a vehicle, and on-vehicle image setting device.

2. Description of the Related Art

An electronic mirror system is known that captures the area to the side, and in the back, of a vehicle with a camera and displays the captured image on a display (for example, Japanese Patent Application Publication No. 2009-83618 (JP 2009-83618 A)). This system includes cameras mounted on the right and left sides of the vehicle body and a display mounted at a position where a driver inside the vehicle, who sits in the driver's seat, can visually recognize an image easily. In this system, the images captured by the cameras mounted on the right and left sides of the vehicle body are displayed on the display. Therefore, this system allows the driver inside the vehicle to visually recognize the area on the side, or in the back, of the vehicle that is displayed on the display, thus realizing a display-based electronic mirror that can be used in place of a physical/optical side mirror.

In the electronic mirror system described above, it is desirable for the driver to visually recognize a position, including the grounding position between the rear wheels and the traveling road, via the electronic mirror to avoid a situation in which the vehicle's inner-turning rear wheel runs against the curbstones or falls in a ditch when the vehicle turns right or left at an intersection. However, in the system described in Japanese Patent Application Publication No. 2009-83618 (JP 2009-83618 A) given above, the area displayed on the display as an image is a fixed and predetermined area captured by the cameras (for example, the whole area).

Therefore, in the system described in Japanese Patent Application Publication No. 2009-83618 (JP 2009-83618 A) given above, the following problem may arise if the area displayed on the display is fixed in a state in which the grounding position between the rear wheels and the traveling road is not sufficiently included. That is, even if the driver visually recognizes the display when the vehicle turns, there is a possibility that the driver cannot sufficiently confirm the grounding position between the rear wheels and the traveling road. On the other hand, if the area displayed on the display is fixed in the state in which the grounding position between the rear wheels and the traveling road is sufficiently included, another problem may arise. That is, because the range of the area in the back of the vehicle becomes small on the image on the display or because the video on the side, and in the back, of the vehicle is not displayed, there is a possibility that the driver finds it difficult to confirm an object at the side, and in the back, of the vehicle.

SUMMARY OF THE INVENTION

The present invention provides an on-vehicle image display device, an on-vehicle image display method, and an on-vehicle image setting device that make it easy for the driver to visually recognize the state of the vehicle's rear wheels without decreasing the visibility on the side, and in the back, of the vehicle when the vehicle turns.

An on-vehicle image display device in a first aspect of the present invention includes an imaging unit that captures an area on a side of a vehicle and in a back of the vehicle, the area including at least a part of a rear wheel of the vehicle; a turning determination unit that determines whether the vehicle will turn and travel; a display control unit that displays a whole or a part of the area, captured by the imaging unit, on a display unit as a non-turning-time image if it is determined by the turning determination unit that the vehicle will travel without turning and displays the whole or a part of the area, captured by the imaging unit, on the display unit as a turning-time image if it is determined by the turning determination unit that the vehicle will turn and travel; and an image setting unit that sets the turning-time image in such a way that a driver visually recognizes a state of the rear wheel more easily through the turning-time image than through the non-turning-time image.

An on-vehicle image display method in a second aspect of the present invention includes determining whether a vehicle will turn and travel; if it is determined that the vehicle will travel without turning, setting a non-turning-time image based on an area on a side of the vehicle and in a back of the vehicle, the non-turning-time image being displayed on a display unit, the area including at least a part of a rear wheel of the vehicle captured by an imaging unit and, if it is determined that the vehicle will turn and travel, setting an image, through which a driver visually recognizes a state of the rear wheel more easily than through the non-turning-time image, as a turning-time image based on the area captured by the imaging unit, the turning-time image being displayed on the display unit; and displaying the non-turning-time image or the turning-time image, which has been set, on the display unit.

According to the present invention, it becomes easy for the driver to visually recognize the state of the vehicle's rear wheels without decreasing the visibility on the side, and in the back, of the vehicle when the vehicle turns.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF THE EMBODIMENTS

An embodiment of an on-vehicle image display device, an on-vehicle image display method for a vehicle, and an on-vehicle image setting device of the present invention are described below with reference to the drawings.

Figure 1:
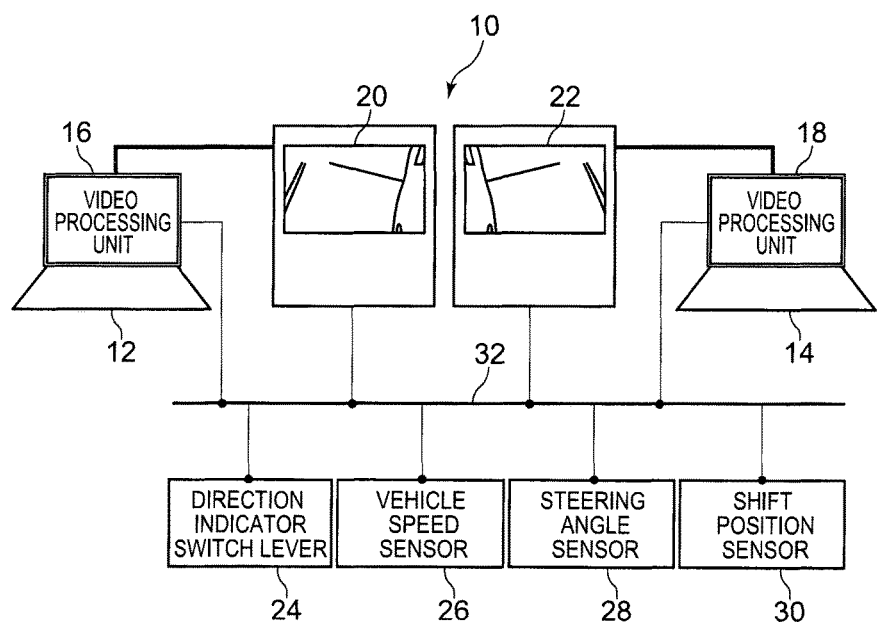
FIG. 1 is a is a diagram showing a configuration of an on-vehicle image display device in one embodiment of the present invention.

FIG. 1 is a diagram showing a configuration of an on-vehicle image display device 10 in one embodiment of the present invention. The on-vehicle image display device 10 in this embodiment is a device, mounted on a vehicle, for displaying the area (in particular, an area that is a blind spot of the driver of the vehicle) on the side, and in the back, of the vehicle as an image. The on-vehicle image display device 10 is an electronic mirror system provided in place of a physical/optical door mirror mounted on the sides of the vehicle body.

As shown in FIG. 1, the on-vehicle image display device 10 includes two cameras, camera 12 and camera 14. The camera 12 is mounted on the left outside of the vehicle body. The camera 14 is mounted on the right outside of the vehicle body. The cameras 12 and 14 may also be mounted each on a tilting stay that sticks out from the outside of the vehicle body to the side of the vehicle. In the description below, the camera 12 is called a left-side camera 12, and the camera 14 is called a right-side camera 14. Both left-side camera 12 and right-side camera 14 are a digital camera that captures an image at a predetermined pixel density.

The left-side camera 12 is oriented toward the back of the vehicle body and obliquely downward from the stay on which it is mounted. The left-side camera 12 can capture a predetermined area on the left side, and in the left back side (that is, in the back of the left side), of the vehicle body, including especially the position that is a blind spot from the driver sitting in the driver's seat. The area captured by the left-side camera 12 includes at least a part of the left rear wheel, the grounding position between the left rear wheel and the traveling road, and the left rear.

The right-side camera 14 is oriented toward the back of the vehicle body and obliquely downward from the stay on which it is mounted. The right-side camera 14 can capture a predetermined area on the right side, and in the right back side (that is, in the back of the right side), of the vehicle body, including especially the position that is a blind spot from the driver sitting in the driver's seat. The area captured by the right-side camera 14 includes at least a part of the right rear wheel, the grounding position between the right rear wheel and the traveling road, and right rear.

The left-side camera 12 includes a video processing unit 16 configured mainly by a microcomputer. The right-side camera 14 includes a video processing unit 18 configured mainly by a microcomputer. That is, the left-side camera 12 and the right-side camera 14 are both a video processing integrated camera that includes the video processing unit 16 or 18. The video processing units 16 and 18 process the video information on the area, captured by the cameras 12 and 14, as will be described later.

The on-vehicle image display device 10 has two displays 20 and 22. The displays 20 and 22 are mounted each at a position where a driver inside the vehicle, who sits in the driver's seat, can visually recognize an image easily. The displays 20 is arranged on the left side inside the vehicle (for example, in pillar A or the window on the left side). The display 22 is arranged on the right side inside the vehicle (for example, in pillar A or the window on the right side). In the description below, the display 20 is called the left-side display 20, and the display 22 is called the right-side display 22, respectively.

The left-side display 20 is connected to the video processing unit 16 included in the left-side camera 12 described above. The video information captured by the left-side camera 12 and video-processed by the video processing unit 16 is supplied to the left-side display 20. The right-side display 22 is connected to the video processing unit 18 included in the right-side camera 14 described above. The video information captured by the right-side camera 14 and video-processed by the video processing unit 18 is supplied to the right-side display 22.

That is, after video processing the video information captured by the left-side camera 12, the video processing unit 16 supplies the video information, captured by the left-side camera 12, to the left-side display 20. When the video information is supplied from the video processing unit 16, the left-side display 20 displays the supplied video as an image. After video processing the video information captured by the right-side camera 14, the video processing unit 18 supplies the video information, captured by the right-side camera 14, to the right-side display 22. When the video information is supplied from the video processing unit 18, the right-side display 22 displays the supplied video as an image.

The on-vehicle image display device 10 includes a direction indicator switch lever 24, a vehicle speed sensor 26, a steering angle sensor 28, and a shift position sensor 30. The direction indicator switch lever 24, vehicle speed sensor 26, steering angle sensor 28, and shift position sensor 30 are each connected to the cameras 12 and 14 and the displays 20 and 22 via an on-vehicle LAN (Local Area Network; for example, Controller Area Network (CAN)) 32.

The cameras 12 and 14, displays 20 and 22, direction indicator switch lever 24, vehicle speed sensor 26, steering angle sensor 28, and shift position sensor 30 each have the function to send and receive data according to the protocol corresponding to the on-vehicle LAN 32. The direction indicator switch lever 24, vehicle speed sensor 26, steering angle sensor 28, and shift position sensor 30 may also be connected to an Electronic Control Unit (ECU) that has the function to send and receive data according to the protocol corresponding to the on-vehicle LAN 32.

The direction indicator switch lever 24 is a lever used to blink the blinker lamp that indicates the direction in which the vehicle is about to turn. The direction indicator switch lever 24 is set in one of the following three states: left side blink state for blinking the blinker lamp on the left side of the vehicle body, right side blink state for blinking the blinker lamp on the right side of the vehicle body, and off state for turning off both blinker lamps. The direction indicator switch lever 24, arranged near the steering wheel, is operated by the driver. The information indicating the state of the direction indicator switch lever 24 is supplied to the video processing units 16 and 18 of the cameras 12 and 14. The video processing units 16 and 18 each determine whether to blink one of the blinker lamps or to turn off the blinker lamps based on the state of the direction indicator switch lever 24.

The vehicle speed sensor 26 is a sensor that outputs the signal corresponding to the speed of the vehicle. The output signal of the vehicle speed sensor 26 is supplied to the video processing units 16 and 18 of the cameras 12 and 14. The video processing units 16 and 18 each detect the speed V of the vehicle based on the output signal of the vehicle speed sensor 26.

The steering angle sensor 28 is a sensor that outputs the signal corresponding to the steering angle of the vehicle. The steering angle sensor 28 is arranged near the steering wheel. The output signal of the steering angle sensor 28 is supplied to the video processing units 16 and 18 of the cameras 12 and 14. The video processing units 16 and 18 each detect the steering angle θ and the steering direction of the vehicle based on the output signal of the steering angle sensor 28.

The shift position sensor 30 is a sensor that outputs the signal corresponding to the shift position of the shift lever operated by the driver. The output signal of the shift position sensor 30 is supplied to the video processing units 16 and 18 of the cameras 12 and 14. The video processing units 16 and 18 each detect the shift position of the shift lever based on the output signal of the shift position sensor 30.

Next, the operation of the on-vehicle image display device 10 in this embodiment is described with reference to FIG. 2 to FIG. 5.

Figure 2:
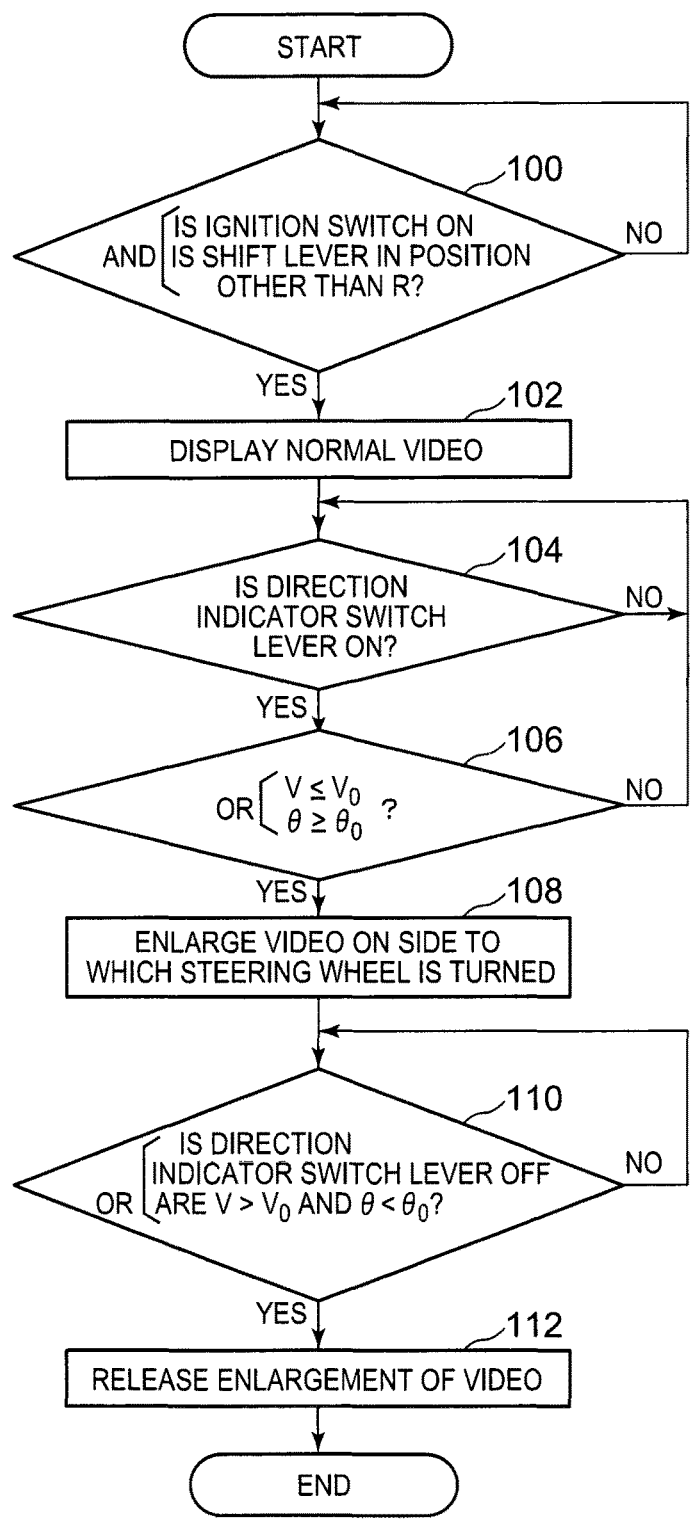
FIG. 2 is a flowchart showing an example of a control routine performed on the on-vehicle image display device in the embodiment.
Figure 3:
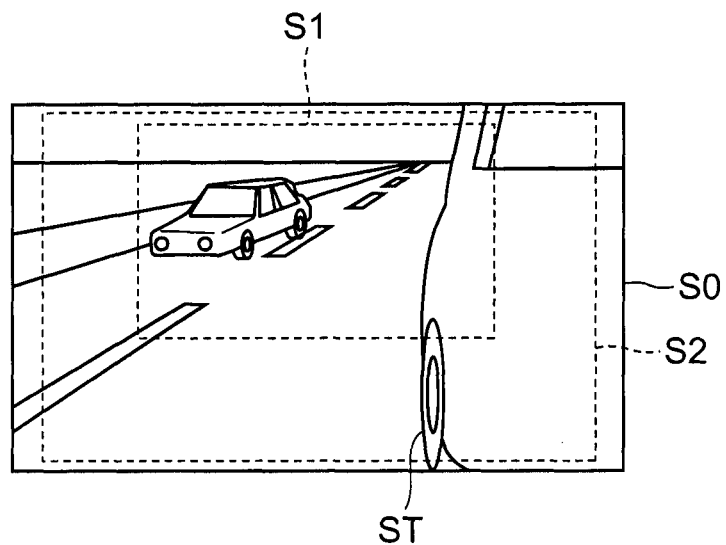
FIG. 3 is a is a diagram showing an example of a video obtained by capturing using an imaging unit of the on-vehicle image display device in the embodiment.
Figure 4:
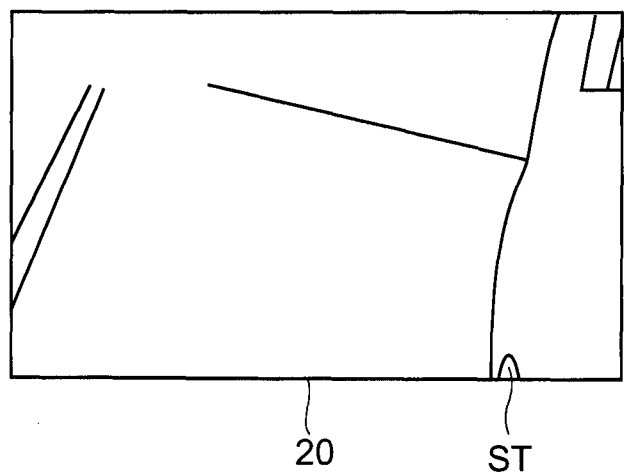
FIG. 4 is a is a diagram showing an example of an image displayed on a display unit of the on-vehicle image display device in the embodiment when the vehicle does not turn but travels straight ahead.
Figure 5:
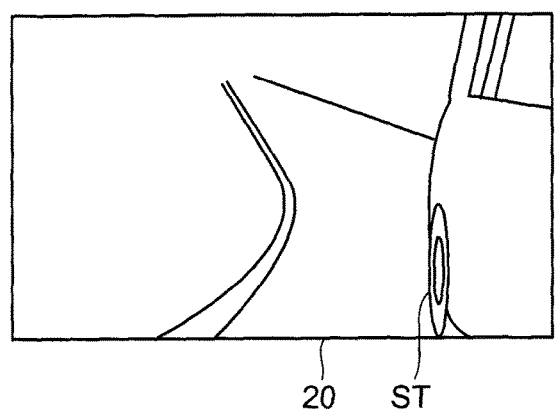
FIG. 5 is a diagram showing an example of an image displayed on the display unit of the on-vehicle image display device in the embodiment when the vehicle turns.

FIG. 2 is a flowchart showing an example of a control routine performed by the ECU 16 in the on-vehicle image display device 10 in the embodiment. FIG. 3 is a diagram showing an example of a video obtained by capturing using the cameras 12 and 14 (more specifically, the left-side camera 12) of the on-vehicle image display device 10 in the embodiment. FIG. 4 is a diagram showing an example of an image displayed on the displays 20 and 22 (more specifically, the left-side display 20) of the on-vehicle image display device 10 in the embodiment when the vehicle does not turn but travels straight ahead. FIG. 5 is a diagram showing an example of an image displayed on the displays 20 and 22 (more specifically, the left-side display 20) of the on-vehicle image display device 10 in the embodiment when the vehicle turns.

In this embodiment, when the accessory switch or the ignition switch of the vehicle is turned on, the power is supplied to the cameras 12 and 14 and the displays 20 and 22 to start the operation. After the power is supplied and the operation is started, the cameras 12 and 14 each capture a predetermined area on the side, and in the back, of the vehicle body. After the operation is started, the video processing units 16 and 18 of the cameras 12 and 14 each perform video processing for the video information on the areas, captured by the cameras 12 and 14, and display the obtained video on the displays 20 and 22 as an image.

More specifically, each of the video processing units 16 and 18 performs the following processing after the operation is started. That is, each of the video processing units 16 and 18 first determines whether the ignition switch is on and whether the shift position, determined based on the output of the shift position sensor 30, is a position other than the "reverse" (R) position that indicates "reverse", (for example, P position indicating "parking", D range indicating "driving", etc.) (step 100). This step is performed repeatedly until it is determined that the ignition switch is turned on and that the shift position is a position other than the R position.

If it is determined in step 100 above that the ignition switch is on and that the shift position, determined based on the output signal of the shift position sensor 30, is a position other than the R position, each of the video processing units 16 and 18 displays the video of a part of the whole area, captured by the corresponding camera 12 or 14, on the corresponding display 20 or 22 (step 102).

More specifically, each of the video processing units 16 and 18 first selects and extracts the video of an area (area S1 shown in FIG. 3), which is a part of the whole area S0 and is positioned at a predetermined position, from the video of the whole area (area S0 shown in FIG. 3) captured by, and supplied from, the camera 12 or 14. The video of the area S1, selected from the whole area S0, is displayed on the corresponding display 20 or 22 as a normal image.

The area S1 selected and extracted as described above includes at least a part of the back and the rear wheels of the vehicle. As shown in FIG. 3, this area S1 is limited to a part in the upper part in which the road distant from the vehicle and a part of the rear wheel are displayed. By limiting the area S1 to the upper part, the lower part of the whole area, S0 captured by the camera 12 or 14, is reserved for use as a part in which the road near to the camera position and the most part of the rear wheel (in FIG. 3, the rear wheel is indicated by ST) are displayed. The aspect ratio (that is, the ratio between horizontal size and the vertical size) of the area S1 is set to a predetermined ratio according to the screen size of the displays 20 and 22.

After displaying the video of the area S1 as a normal image on the displays 20 and 22 as described above, each of the video processing units 16 and 18 first determines whether the direction indicator switch lever 24 is in the ON state in which the corresponding blinker lamp is to be blinked (step 104). That is, the video processing unit 16 of the left-side camera 12 determines whether the direction indicator switch lever 24 is in ON the state in which the blinker lamp on the left side of the vehicle body is to be blinked. The video processing unit 18 of the right-side camera 14 determines whether the direction indicator switch lever 24 is in the ON state in which the blinker lamp on the right side of the vehicle body is to be blinked. This determination step is repeated until the direction indicator switch lever 24 is determined to be in the ON state.

If it is determined in step 104 that the direction indicator switch lever 24 is in the ON state, each of the video processing units 16 and 18 determines next whether the vehicle speed V based on the output signal of the vehicle speed sensor 26 is equal to or smaller than a predetermined vehicle speed V0 or whether the steering angle θ based on the output signal of the steering angle sensor 28 is equal to or larger than a predetermined steering angle θ0 (step 106). This determination step is repeated until it is determined that the vehicle speed V is equal to or smaller than the predetermined vehicle speed V0 or the steering angle θ is equal to or larger than the predetermined steering angle θ0.

The predetermined vehicle speed V0 described above is the maximum speed below which, when the vehicle turns right or left at an intersection and so on, the driver need to recognize the part near the grounding position between the rear wheel and the traveling road via the displays 20 and 22. For example, the predetermined vehicle speed V0 is set to 20 km/h. The predetermined steering angle θ0 described above is the minimum steering angle above which, when the vehicle turns right or left at an intersection and so on, the driver need to recognize the part near the grounding position between the rear wheel and the traveling road via the displays 20 and 22. For example, the predetermined steering angle θ0 is set to a steering angle corresponding to an angle when the steering wheel is turned 90 degrees from the neutral position.

If it is determined in step 106 that V≤V0 or θ≥θ0 is satisfied and if the corresponding camera 12 or 14 is the camera on the vehicle traveling side (inner-turning side) when the vehicle turns, the video processing unit 16 or 18 displays the video of the whole or a part of the whole area S0, captured by the corresponding camera 12 or 14, on the corresponding display 20 or 22 (step 108).

More specifically, the video processing unit 16 or 18 performs the following processing for the video supplied from the inner-turning camera 12 or 14. That is, the video processing unit 16 or 18 first selects and extracts the video of the area (area S2 shown in FIG. 3), which is the whole or a part of the whole area S0 and is positioned at a predetermined position, from the video of the whole area S0 supplied from the inner-turning camera 12 or 14. After that, the video processing unit 16 or 18 displays the video of the area S2, selected from the whole area S0, on the corresponding display 20 or 22 as a turning-time image.

The area S2, a turning-time image selected and extracted as described above, is set in such a way that, as compared with the area S1 that is a normal image described above, the vehicle's driver can visually recognize the state of the rear wheel of the vehicle, displayed on the display 20 or 22, more easily. More specifically, the area S2 is a part of the whole area S0 captured by the camera 12 or 14 and is an area made larger than the area S1.

The area S2 includes at least the area in the back of the vehicle, at least a part of the rear wheel, and the grounding position between the rear wheel and the traveling road. This area S2, which may be all of the whole area S0 captured by the camera 12 or 14 on the inner-turning side, is set at a position where both the upper part and the lower part are included as shown in FIG. 3. The upper part, a part of the whole area S0 captured by the inner-turning camera 12 or 14, is an area where the road distant from the vehicle and a part of the rear wheel are displayed. The lower part is an area where the road nearer to the vehicle and the most of the rear wheel (the rear wheel is indicated by ST in FIG. 3) are displayed. That is, the area S2 is set as an area that includes at least all of the area S1 described above and that is larger than the area S1. The aspect ratio of the area S2, which is set to a predetermined aspect ratio corresponding to the screen size of the display 20 or 22, is the same as that of the area S1.

When the above video processing is performed by the video processing unit 16 or 18, only the video, which is displayed on the display 20 or 22 corresponding to the inner-turning side, is changed from the normal image in the area S1 to the turning-time image in the area S2. When changing the video displayed on the display 20 or 22 on the inner-turning side from the normal image in the area S1 to the turning-time image in the area S2 in step 108, the video processing unit 16 or 18 changes the video from the normal image to the turning-time image using an electronic zooming method, such as morphing, in a predetermined time (for example, one second or two seconds).

If the condition $V \leq V0$ or $\theta \geq \theta0$ is satisfied in step 106 and the camera 14 or 12 is the camera on the opposite side (outer-turning side) of the vehicle traveling side when the vehicle turns, the video processing unit 18 or 16 continues to display the normal image, which includes the area S1 selected from the video of the whole area S0 captured by the camera 14 or 12, on the display 22 or 20 corresponding to the outer-turning side.

The video processing unit 16 or 18 displays the video of the area S2 on the display 20 or 22 on the inner-turning side as a turning-time image as described above. After that, the video processing unit 16 or 18 determines whether the direction indicator switch lever 24 is in the state in which the corresponding blinker lamp is to be turned off or whether the vehicle speed V based on the output of the vehicle speed sensor 26 exceeds the predetermined vehicle speed V0 and the steering angle $\theta$ based on the output signal of the steering angle sensor 28 is smaller than the predetermined steering angle $\theta0$ (step 110). This determination step is repeated until it is determined that the direction indicator switch lever 24 is in the state in which the corresponding blinker lamp is to be turned off or whether the vehicle speed V exceeds the predetermined vehicle speed V0 and the steering angle $\theta$ is smaller than the predetermined steering angle $\theta0$.

If it is determined in step 110 that the direction indicator switch lever 24 is in the state in which the corresponding blinker lamp is to be turned off or that the vehicle speed V exceeds the predetermined vehicle speed V0 and the steering angle $\theta$ is smaller than the predetermined steering angle $\theta0$, the video processing unit 16 or 18 releases the display of the turning-time image on the display 20 or 22 corresponding to the inner-turning side (step 112).

After the video processing is performed by the video processing unit 16 or 18 as described above, the video displayed on the display 20 or 22 on the inner-turning side is changed from the turning-time image in the area S2 to the normal image in the area S1. As a result, the normal image in the area S1 is displayed on both displays 20 and 22. When changing the video displayed on the display 20 or 22 on the inner-turning side from the turning-time image in the area S2 to the normal image in the area S1 in step 112, the video processing unit 16 or 18 changes the video from the turning-time image to the normal image using an electronic zooming method, such as morphing, in a predetermined time (for example, one second or two seconds).

As described above, the on-vehicle image display device 10 in this embodiment sets the area, which is displayed on the display 20 or 22 as an image. That is, when the vehicle travels without turning, the area, which is displayed on the display 20 or 22 as an image, is set to the area S1 of the whole area S0. On the other hand, when the vehicle turns, the area, which is displayed on the display 22 or 20 on the outer-turning side as an image, is maintained to the area S1 of the whole area S0 but the area, which is displayed on the display 20 or 22 on the inner-turning side as an image, is set to the area S2 of the whole area S0. In particular, when the vehicle turns, the area, which is displayed on the display 20 or 22 on the inner-turning side as an image, is changed from area S1, which is displayed when the vehicle travels without turning, to the area S2. As a result, the image, which is displayed on the display 20 or 22 on the inner-turning side, is changed from the normal image in the area S1 to the turning-time image in the area S2.

As described above, the area S1 includes the area in the back of the vehicle, at least a part of the rear wheel. Of the whole area S0 captured by the camera 12 or 14, the area S1 is limited to the upper part in which the road distant from the vehicle and a part of the rear wheel ST are displayed. On the other hand, the area S2 includes the area in the back of the vehicle, at least a part of the rear wheel, and the grounding position between the rear wheel and the traveling road. Of the whole area S0 captured by the camera 12 or 14, the area S2 includes both the upper part, in which the road distant from the vehicle and a part of the rear wheel are displayed, and the lower part in which the road nearer to the vehicle and the most of the rear wheel ST are displayed.

Therefore, the range, which is a part of the whole area S0 captured by the camera 12 or 14 and which includes the turning-time image displayed on the display 20 or 22 on the inner-turning side when the vehicle turns, can be made larger than the range which includes the normal image that is displayed on the displays 20 and 22 when the vehicle does not turn or that is displayed on the display 22 or 20 on the outer-turning side when the vehicle turns. This allows the turning-time image to be set in such a way that the driver can view the image displayed on the display 20 or 22 and visually recognize the state of the rear wheel of the vehicle more easily than when the driver views the normal image.

In this configuration, the range, which is a part of the whole area s0 captured by the camera 12 or 14 and is occupied by the rear wheel on the inner-turning side included in the area S2 displayed on the display 20 or 22 on the inner-turning side as a turning-time image when the vehicle turns, is larger than the range which is occupied by the rear wheel included in the area S1 displayed on the displays 20 and 22 as a normal image when the vehicle does not turn. That is, of the two ranges in which the rear wheel is displayed in the whole area S0, the range in which the rear wheel is displayed in the area S2 is larger than the range in which the rear wheel is displayed in the area S1. Therefore, when the vehicle turns, the grounding position between the rear wheel on the inner-turning side of the vehicle and the traveling road and the area near the grounding position can be displayed clearly on the display 20 or 22 on the inner-turning side. This allows the driver to visually recognize the state of the rear wheel on the inner-turning side easily.

As described above, the area S2 is an area that includes all of the area S1 and is enlarged larger than the area S1. Therefore, the configuration described above avoids the state, in which the range, occupied by the area in the back of the vehicle included in the area S2 that is displayed on the display 20 or 22 on the inner-turning side as a turning-time image when the vehicle turns, becomes smaller than the range occupied by the area when the vehicle does not turn or avoids the state in which the area in the back of the vehicle is not displayed at all. For this reason, when an object approaches from the area on the side, or in the back, of the vehicle, this configuration maintains the state in which the driver can visually recognize the approaching object easily.

Therefore, the on-vehicle image display device 10 in this embodiment reserves a sufficient display range, in which the grounding position between the rear wheel and the traveling road on the inner-turning side and the area near the grounding position are displayed, without narrowing the display range of the area on the side, and in the back, of the vehicle when the vehicle turns. This means that the configuration allows the driver to visually recognize the state of the rear wheel on the inner-turning side easily without decreasing the visibility of the area on the side, and in the back, of the vehicle. Therefore, the on-vehicle image display device 10 in this embodiment helps the driver avoid the situation in which the vehicle's inner-turning rear wheel runs against the curbstones or falls in a ditch while, at the same time, ensuring safe traveling when the vehicle turns in the same manner as when the vehicle does not turn.

In this embodiment, when the vehicle turns, only the area that is displayed on the display 20 or 22 on the inner-turning side as an image is changed from the area S1 to the area S2. On the other hand, the area that is displayed on the display 22 or 20 on the outer-turning side remains to be the area S1. When the vehicle turns, it is important for the driver, who drives the vehicle, to recognize the state on the inner-turning side of the vehicle body. Therefore, according to this embodiment, when the vehicle turns, the area displayed on the display 20 or 22 is changed only on the display 20 or 22 on the inner-turning side. Changing the area in this way is necessary and sufficient for safe driving.

In this embodiment, when the vehicle turns, the area displayed on the display 20 or 22 on the inner-turning side as an image is changed from the area S1 to the area S2. This change is performed if it is determined that the vehicle is turning because the direction indicator switch lever 24 is in the ON state and the steering angle θ is large. In addition, this change is performed if the direction indicator switch lever 24 is in the ON state and the vehicle speed V is low.

If the direction indicator switch lever 24 is in the ON state and the vehicle speed V is low, there is a high possibility that the vehicle is going to turn right or left and, in this case, it is estimated that the vehicle will turn and continue traveling.

Therefore, according to this embodiment, the area is changed from the area S1 to the area S2 on the display 20 or 22 on the inner-turning side immediately before the vehicle turns. This enables the driver to start visually recognizing the grounding position between the rear wheel and the traveling road and the area near to the grounding position on the inner-turning side via the display 20 or 22 on the inner-turning side at an early time immediately before turning.

In this embodiment, the area S2, which is displayed on the display 20 or 22 on the inner-turning side as an image when the vehicle turns, is enlarged larger than the area S1 that is displayed when the vehicle travels without turning. After that, if the direction indicator switch lever 24 becomes the OFF state or if the steering angle θ becomes small and the vehicle speed V becomes high, it is determined that the vehicle has finished turning. When the vehicle has finished turning, the display of the turning-time image in the area S2 on the display 20 or 22 on the inner-turning side is released. Once released, the display on the display 20 or 22 returns to the normal image in the area S1. In this manner, after the vehicle has finished turning, the on-vehicle image display device 10 in this embodiment provides the driver with the normal display via the right or left display 20 or 22, thus allowing the driver to travel safely as usual.

In this embodiment, when the image displayed on the display 20 or 22 is changed from the normal image in the area S1 to the turning-time image in the area S2 (that is, when the image is changed from the normal image to the turning-time image or, conversely, from the turning-time image to the normal image), the change is made using an electronic zooming method, such as morphing, in a predetermined time. Therefore, this embodiment avoids the situation in which the display on the display 20 or 22 is changed suddenly between the normal image in the area S1 and the turning-time image in the area S2, preventing the display change from giving the driver a feeling that something is wrong.

In this embodiment, the area S1 and the area S2, which are displayed on the display 20 or 22 as an image, have the same aspect ratio. Having the same aspect ratio between these areas in this manner prevents the aspect ratio of the area, displayed on the display 20 or 22 as an image, from being changed when the area displayed on the display 20 or 22 as an image is changed between the area S1 and the area S2. Therefore, when the vehicle is going to turn or has finished turning, this embodiment allows the driver to easily keep a sense of distance in an image when viewing the display 20 or 22, preventing the change in the area displayed on the display 20 or 22 from giving the driver a feeling that something is wrong.

In the embodiment described above, the cameras 12 and 14 are an example of "imaging means" and an "imaging unit". The ECU 16 is an example of "turning determination means" and a "turning determination unit". The execution of the processing by the ECU 16 in steps 104, 106, and 110 in the routine shown in FIG. 2 is an example of "determining whether a vehicle will turn and travel". The normal image in the area S1 is an example of a "non-turning-time image" and a "first image". The turning-time image in the area S2 is an example of a "turning-time image" and a "second image". The displays 20 and 22 are an example of "display means". The ECU 16 is also an example of "display control means". The execution of the processing in steps 108 and 112 by the ECU 16 is an example of "displaying the non-turning-time image or the turning-time image, which has been set, on the display unit". The ECU 16 is also an example of "image setting means" and an "image setting unit". Setting, by the ECU 16, the turning-time image in the area S2 in such a way that, as compared with the normal image in the area S1, the driver can visually recognize the state of the rear wheel of the vehicle more easily is an example of "if it is determined that the vehicle will travel without turning, setting a non-turning-time image based on an area on a side of the vehicle and in a back of the vehicle, the non-turning-time image being displayed on a display unit, the area including at least apart of a rear wheel of the vehicle captured by an imaging unit and, if it is determined that the vehicle will turn and travel, setting an image, through which a driver visually recognizes a state of the rear wheel more easily than through the non-turning-time image, as a turning-time image based on the area captured by the imaging unit, the turning-time image being displayed on the display unit."

In the embodiment described above, the state of the direction indicator switch lever 24 and the steering angle θ based on the output of the steering angle sensor 28 are used to determine whether the vehicle turns. The present invention is not limited to this method. Instead, in addition to, or in place of, the parameters, the result of determination, which indicates whether the position of the vehicle in the navigation system has reached an intersection where the vehicle will turn right or left on the navigation route, may be used.

In the embodiment described above, the displays 20 and 22 are arranged on the left side and the right side inside the vehicle. The present invention is not limited to this arrangement. Instead, the meters on the instrumental panel or a multi-information display may be used as the displays 20 and 22.

In the embodiment described above, the cameras 12 and 14 are a video processing integrated camera that includes the video processing unit 16 or 18. The present invention is not limited to this type of camera. Instead, a video processing unit, configured mainly by a microcomputer, may be provided outside the camera 12 or 14. In this case, the video information captured by the left-side camera 12 and the video information captured by the right-side camera 14 may be processed by separate video processing units or by the common video processing unit.

In addition, in the embodiment described above, the area S2, which is a part of the whole area S0 captured by the camera 12 or 14 and is displayed on the display 20 or 22 on the inner-turning side as an image when the vehicle turns, is enlarged larger than the area S1 while including all of the area S1 that is displayed on the display 22 or 20 on the outer-turning side when the vehicle turns as an image or on the display 20 or 22 as an image when the vehicle does not turn. In this way, this embodiment allows the vehicle driver to view the image displayed on the display 20 or 22 and to visually recognize the state of the rear wheel of the vehicle more easily when the driver views the turning-time image than when the driver views the normal image.

The present invention is not limited to the method described above. As means for allowing the vehicle driver to view the image displayed on the display 20 or 22 and to visually recognize the state of the rear wheel of the vehicle more easily through the turning-time image than through the normal image, another method may also be used. For example, instead of enlarging the area S2, which is displayed on the display 20 or 22 as the turning-time image, larger than the area S1 which is displayed as the normal image in the whole area S0, the position of the area S1 may be changed within the whole area S0 (that is, the position of the area, selected from the whole area S0 for extraction, is changed between the time the vehicle turns and the time the vehicle does not turn). In addition, instead of making the area S2, which is displayed on the display 20 or 22 as an image when the vehicle turns, larger than the area S1 which is displayed on the display 20 or 22 in the whole area S0 as an image when the vehicle does not turn and instead of changing the position of the area S1, only the range, occupied by the rear wheel on the inner-turning side included in the area S2, may be enlarged larger than the range occupied by the rear wheel included in the area S1. These modifications also clearly display the grounding position between the rear wheel on the inner-turning side of the vehicle and the traveling road, as well as the area near to the grounding position, on the display 20 or 22 on the inner-turning side when the vehicle turns, allowing the driver to visually recognize the state of the rear wheel on the inner-turning side easily.

The invention claimed is:

1. An on-vehicle image display device comprising:
   a display unit;
   an imaging unit configured to capture an imaging area on a side of a vehicle and behind the vehicle, the imaging area including at least a part of a rear wheel of the vehicle; and
   an electronic control unit configured to determine whether the vehicle will turn and travel, the electronic control unit is configured to display a first portion of the imaging area, captured by the imaging unit, on the display unit as a non-turning-time image for the vehicle when the electronic control unit determines that the vehicle will travel without turning, and the electronic control unit is configured to display a second portion of the imaging area, captured by the imaging unit, on the display unit as a turning-time image for the vehicle when the electronic control unit determines that the vehicle will turn and travel,
   wherein a greater amount of the rear wheel is visually displayed on the display unit in the second portion of the imaging area than is visually displayed on the display unit in the first portion of the imaging area.

2. The on-vehicle image display device according to claim 1, wherein the second portion of the imaging area is a larger area of the imaging area captured by the imaging unit than is the first portion of the imaging area.

3. The on-vehicle image display device according to claim 1, wherein
   the turning-time image includes at least a grounding position between the rear wheel and a traveling road.

4. The on-vehicle image display device according to claim 1, wherein
   the second portion of the imaging area captured by the imaging unit includes all of the first portion of the imaging area.

5. The on-vehicle image display device according to claim 1, wherein
   the electronic control unit is configured to determine that the vehicle will turn and travel when a direction indicator switch lever is operated and a vehicle speed.

6. The on-vehicle image display device according to claim 1, wherein
   the electronic control unit is configured to change the image, displayed on the display unit, from the turning-time image to the non-turning-time image when the state determined by the electronic control unit changes from the state, in which it is determined that the vehicle will turn, to the state in which it is determined that the vehicle will not turn.

7. The on-vehicle image display device according to claim 1, wherein
the electronic control unit is configured to change an image, displayed on the display unit, between the non-turning-time image and the turning-time image in a predetermined time.

8. The on-vehicle image display device according to claim 1, wherein
the non-turning-time image and the turning-time image has a same aspect ratio.

9. The on-vehicle image display device according to claim 1, wherein
the imaging unit is provided on each of a right side and a left side of a vehicle body of the vehicle,
the electronic control unit is configured to display the first portion of the imaging area or the second portion of the imaging area, captured by the imaging unit on each of the right side and the left side of the vehicle body, on the display unit each as an image and
the electronic control unit is configured to set only the turning-time image, captured by the imaging unit corresponding to a side that the vehicle is going to turn into, such that the driver visually recognizes the state of the rear wheel more easily through the turning-time image than through the non-turning-time image.

10. The on-vehicle image display device according to claim 1, wherein the electronic control unit is configured to determine that the vehicle will turn and travel when a direction indicator switch lever is operated and a steering angle is equal to or larger than a predetermined steering angle.

11. The on-vehicle image display device according to claim 1, wherein the electronic control unit is configured to determine that the vehicle will travel without turning when a direction indicator switch lever is not operated.

12. The on-vehicle image display device according to claim 1, wherein the electronic control unit is configured to determine that the vehicle will travel without turning when a vehicle speed is higher than a predetermined vehicle speed and a steering angle is smaller than a predetermined steering angle.

13. The on-vehicle image display device according to claim 1, wherein the electronic control unit is configured to change the image, displayed on the display unit, from the non-turning-time image to the turning-time image when a state determined by the electronic control unit changes from a state, in which it is determined that the vehicle will not turn, to a state in which it is determined that the vehicle will turn.

14. An on-vehicle image display method for a vehicle, the vehicle including an electronic control unit and a display unit, the on-vehicle image display method comprising:
determining, by the electronic control unit, whether the vehicle will turn and travel;
setting, by the electronic control unit, a non-turning-time image to be displayed on the display unit when the electronic control unit determines that the vehicle will travel without turning, the non-turning-time image being based on an area on a side of the vehicle and behind the vehicle, the area including at least a part of a rear wheel of the vehicle captured by an imaging unit;
setting, by the electronic control unit, an image in which a greater amount of the rear wheel can be viewed than through the non-turning-time image, as a turning-time image based on the area captured by the imaging unit, the turning-time image configured to be displayed on the display unit; and
displaying, by the electronic control unit, the non-turning-time image that has been set or the turning-time image that has been set, on the display unit.

15. An on-vehicle image setting device comprising:
a display device;
an imaging unit that captures an imaging area on a side of a vehicle and behind the vehicle, the imaging area including at least a part of a rear wheel of the vehicle; and
an electronic control unit configured to determine whether the vehicle will turn and travel, the electronic control unit is configured to output a first image when the electronic control unit determines that the vehicle will travel without turning, the electronic control unit is configured to output a second image when the electronic control unit determines that the vehicle will turn and travel, the first image is configured to be displayed on the display device based on an image captured by the imaging unit, the second image is configured to be displayed on the display device based on the image captured by the imaging unit,
wherein a greater amount of the rear wheel is visually displayed in the second image than is visually displayed in the first image.

* * * * *